STURDEVANT, PARSONS & WHEELER.
Milk Shelf.
No. 53,500. Patented March 27, 1866.
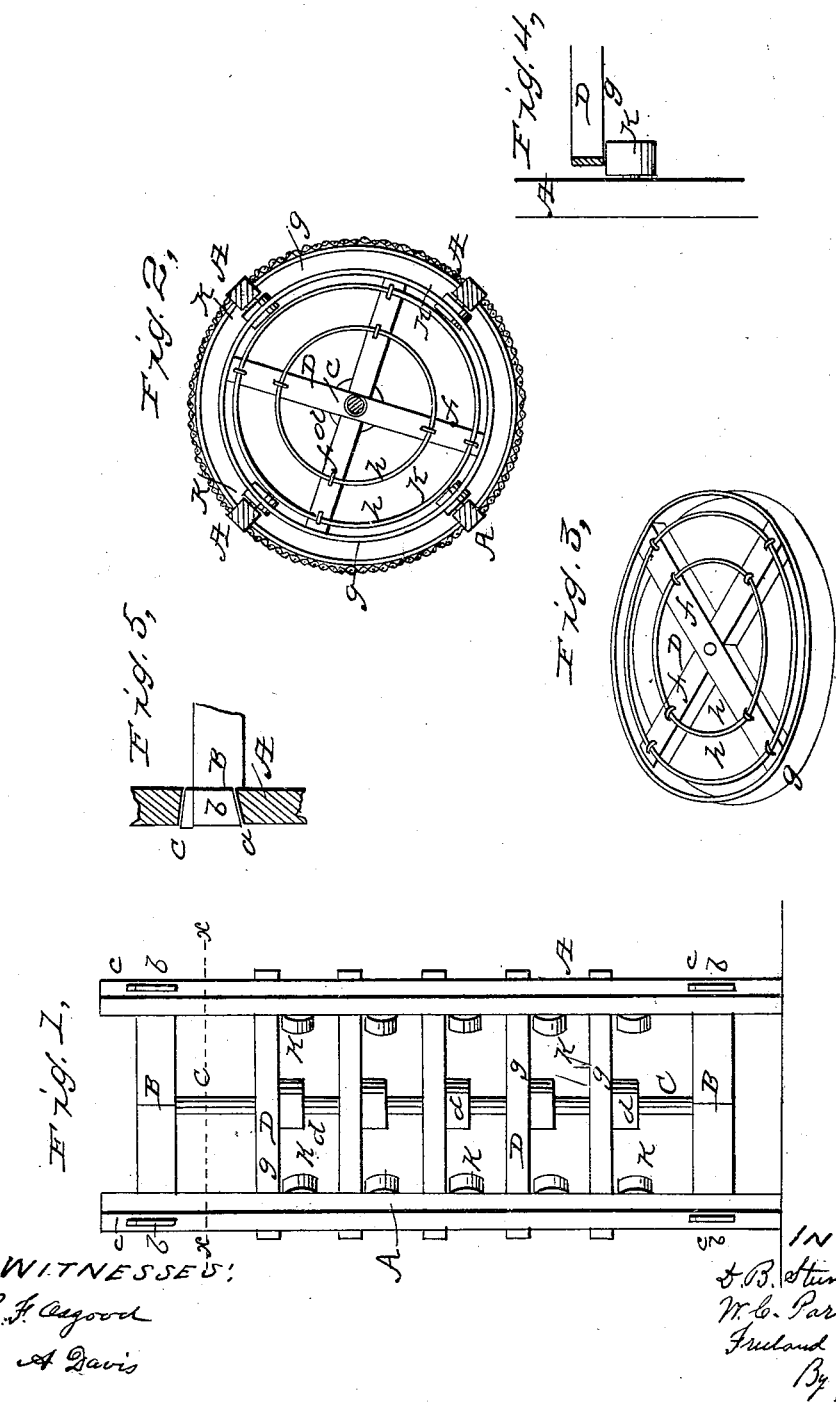

UNITED STATES PATENT OFFICE.

DANIEL B. STURDEVANT, WM. C. PARSONS, AND FREELAND WHEELER, OF CLIFTON SPRINGS, NEW YORK.

IMPROVEMENT IN MILK-SHELVES.

Specification forming part of Letters Patent No. 53,500, dated March 27, 1866.

*To all whom it may concern:*

Be it known that we, DANIEL B. STURDEVANT, WILLIAM C. PARSONS, and FREELAND WHEELER, of Clifton Springs, in the county of Ontario and State of New York, have invented a new and useful Improvement in Revolving Shelves for Holding Milk, &c.; and we do hereby declare that the following is a full and exact description thereof, reference being had to the accompanying drawings, making part of this specification.

Figure 1 is a side elevation of our improved arrangement of shelves; Fig. 2, a horizontal section of the frame in the plane of line $x\ x$, Fig. 1, and a plan of one of the revolving shelves; Fig. 3, a perspective view of one of the shelves detached; Fig. 4, a diagram showing the manner of supporting the shelves upon the friction-rollers; Fig. 5, a diagram showing the method of securing the parts composing the portable frame.

Like letters of reference indicate corresponding parts in all the figures.

Our invention consists in the employment of a series of revolving shelves of skeleton form, arranged one above another in a portable frame, each revolving independently of the rest, and resting on friction-rollers to support it steadily and allow it to turn easily.

As represented in the drawings, a suitable frame is provided, made up of posts A and cross-pieces B, united by mortises and tenons $a\ b$, and locked by keys $c$, or equivalent, so that the whole can be easily set up or taken apart. Within this frame is situated a vertical shaft, C, having fixed bearings $d\ d$ at suitable distances apart, on which rest the revolving skeleton-shelves D D. These shelves are made in any convenient form, so as to turn upon the shaft and admit a free circulation of air from bottom to top. In the drawings they are shown as made up of cross-pieces $f\ f$, with a central hole for admitting the shaft, and a rim, $g$, and wires $h\ h$, which serve to sustain the pans of milk or other articles placed thereon. We prefer to place under each shelf a series of friction-rollers, $k\ k$, connected with the posts, as clearly shown.

The device thus constructed forms a very convenient and useful arrangement for dairy and other use. The frame is readily put together and taken apart, so that it can be easily transferred above or below stairs, as the season may require.

The shelves being of skeleton form allow a free circulation of air from bottom to top around the milk, which is a matter of much importance. If desired, the frame may be encircled by a screen of cloth or wire-gauze, as shown in Fig. 2, to keep out dirt and insects.

The chief advantage consists, however, in the rotary action of the shelves, and in making each shelf revolve independently of the others. By this means the pans of milk may be placed, one after another, in position from the same spot and turned back, and may also be removed in the same way. In skimming the milk the rotary motion allows each pan to be brought successively to the operator without removing from his station. By making each shelf revolve independently the milk on the other shelves remains undisturbed, which is a matter of much importance, especially when different milkings are in place and it is desirable not to disturb the cream.

The employment of the friction-rollers beneath the shelves always keeps the latter in their level position, and not only sustain the same under their load, but also insures the free and easy turning of the shelves, so as to disturb the milk and cream as little as possible.

It is obvious that the shelves might be attached to the shaft and all be made to revolve at once, but such an arrangement would not be so advantageous as that described. It is also obvious that the friction-rollers might be dispensed with, but the device, under such circumstances, would not be so effective.

What we claim as our invention, and desire to secure by Letters Patent, is—

The combined construction and arrangement of the series of independently-revolving skeleton-shelves D D, friction-rollers $k\ k$, and portable frame A B, the whole admitting a free circulation of air, and operating substantially as and for the purpose herein set forth.

In witness whereof we have hereunto signed our names in the presence of two subscribing witnesses.

D. B. STURDEVANT.
    W. C. PARSONS.
    FREELAND WHEELER.

Witnesses:
 GEO. L. PRICE,
 HENRY GRAY.